B. B. NEUTEBOOM.
CLUTCH.
APPLICATION FILED MAR. 11, 1912.
1,167,012.
Patented Jan. 4, 1916.
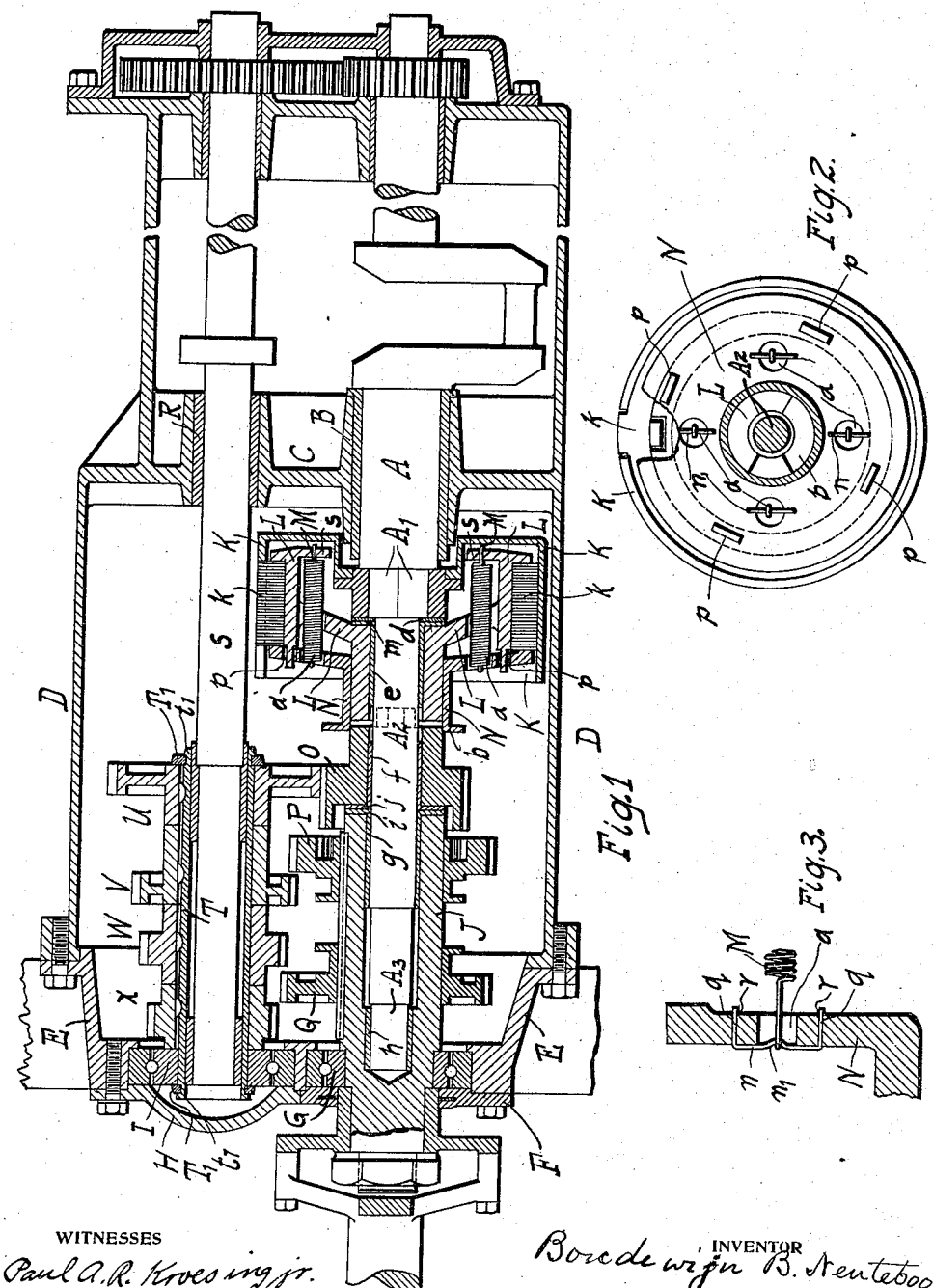
WITNESSES
INVENTOR
BY
ATTORNEY
COLUMBIA PLANOGRAPH CO., WASHINGTON, D. C.

UNITED STATES PATENT OFFICE.

BOUDEWIJN B. NEUTEBOOM, OF DETROIT, MICHIGAN.

CLUTCH.

1,167,012.   Specification of Letters Patent.   Patented Jan. 4, 1916.

Application filed March 11, 1912. Serial No. 682,973.

*To all whom it may concern:*

Be it known that I, BOUDEWIJN B. NEUTEBOOM, a subject of the Queen of Holland, residing at Detroit, county of Wayne, State of Michigan, have invented a certain new and useful Improvement in Clutches, and declare the following to be a full, clear, and exact description of the same, such as will enable others skilled in the art to which it pertains to make and use the same, reference being had to the accompanying drawings, which form a part of this specification.

My invention relates to clutches and consists in the improvements hereinafter described and pointed out in the claim.

In the accompanying drawings,—Figure 1, is a sectional plan view of an apparatus embodying my invention. Fig. 2, is a detail elevation partly in section on the line 2—2 Fig. 1 looking from the left of said line. Fig. 3, is a detail view illustrating a method of securing the clutching springs.

D, D is the gear case having end walls C and E.

A, is a shaft resting in a bearing B in the end wall C and extending toward the end wall E, and in the present case extending into the plane of the wall E.

G, is a radial and thrust ball bearing resting in an aperture in the end wall E.

F, is a plate securing the bearing G in place.

J, is a hollow shaft resting in the bearing G and sleeved upon the shaft A. The shaft A is provided with a squared portion $A^1$ toward its right hand end and extends therefrom to the left in the portions $A^2$ and $A^3$.

S, is a shaft resting in a bearing R in the wall C.

I, is a radial and thrust ball bearing resting in an aperture in the wall E and held in place by a cover plate H.

T, is a sleeve rotatable upon the shaft S and resting in the bearing I. The shaft S extends through the sleeve T and into the plane of the bearing I.

U, V, W, X, are gear wheels of different diameters keyed upon the sleeve T.

P and Q are gear wheels adapted to slide on a feather on the shaft J.

The shafts A and S are parallel and the gear wheels P and Q are adapted to engage gear wheels upon the sleeve T.

O, is a gear wheel sleeved upon the portion $A^2$ of the shaft A, its teeth engaging the teeth of the gear wheel U. The gear wheel P is provided with a toothed clutch adapted to engage a corresponding clutch on the gear wheel O so as to connect the shaft J directly to the gear wheel O.

K, is a hollow drum secured to the squared portion $A^1$ of the shaft A. The cylindrical walls of the drum K are parallel to the shaft A.

L, is a drum sleeved about the shaft A within the drum K and having its cylindrical walls parallel to said shaft and to the corresponding walls of the drum K.

$k$, are friction plates engaging the drums L and K of such a construction that when said plates are pressed together they shall bind said drums together. The hub of the drum L adjacent to the gear wheel O is provided with a toothed clutch member which engages a corresponding member on the hub of the gear wheel O.

N, is a presser-disk sleeved upon the hub of the drum L and adapted to move longitudinally of the axis of said hub and of the shaft A. A means, not shown, but which will be readily supplied by those conversant with the art, is contemplated, by which the disk N may be drawn out of engagement with the friction plates. The periphery of the disk N normally rests against the left hand one of the annular friction plates $k$. The drum L is provided with lugs at its periphery which extend through slots $p$ in the disk N so as to restrain relative angular movement of said disk and drum.

$s$, is a flange upon the drum L extending in a plane at right angles to the axis of said drum.

M, M are tension springs inside of, and parallel to the cylindrical walls of the drum L. One end of each of the springs M is connected to the flange $s$ within the cylindrical peripheral walls of the drum L and the other end of the spring is secured to the disk N, as hereinafter described. The action of the springs M, M is to draw the disk N inward pressing its periphery against the friction plate $k$ and causing said plates to engage each other and bind the drums K and L together. By moving the disk N outward the friction is relieved on the disk $k$ and the drums K and L are free to turn independent of each other.

$h$, is a bushing surrounding the portion $A^3$ of the shaft A and bearing against the interior of the shaft J.

$g$, and $f$ are bushings surrounding the portion $A^2$ of the shaft A and provided respectively with outwardly extending annular flanges $i$ and $j$ which flanges are contiguous and are interposed between the gear wheel O and the adjacent end of the shaft J. The sleeve $g$ rests in the bore of the shaft J and the bushing $f$ is within the gear wheel O and carries said gear wheel.

$e$, is a bushing within the hub of the drum L and carrying said drum. The bushing $e$ is provided with an outwardly extending annular flange $m$ which passes up against the inner end of the hub of the drum L.

$d$, is a washer interposed between the annular flange $m$ and the hub of the gear wheel K. The washer $d$ may be of such a thickness as shall take up the lost motion which would otherwise occur between the sleeve J, gear wheel O and drum L and thus any imperfection of workmanship may be compensated for.

The outer or left hand ends of the springs M are secured to the disk N in the following manner: Referring more particularly to Figs. 2 and 3, $n$ is a wire or small bar bent in a loop $n^1$ at its center and bent at right angles at its ends to form the portions $q$, $q$, which pass into or through apertures $r$, $r$ located in the disk N at equal distances from an aperture $a$ in the disk N. When the portions $q$, $q$ of the wire $n$ extend into the apertures $r$, $r$ the loop $n^1$ extends into the aperture $a$, as shown in Fig. 3. A hook formed upon the end of the spring M engages this loop and thus the spring is secured to the disk N.

$T^1$, $T^1$, are split rings adapted to fit into grooves $t^1$, $t^1$, around the ends of the sleeve T. The gear wheels are placed upon the sleeve T and the rings $T^1$ are then snapped into the grooves $t^1$ to hold the wheels in place.

By placing the springs M within the drum L room otherwise not occupied is made available and greater compactness of the mechanism is secured. The parts may be easily adjusted to position and removed for inspection and repairs. The end plate E may be removed carrying the bearings G and I and the sleeves T and J with it. The gear wheel O may be removed by simply sliding it along and over the extension of the shaft A. These parts may be placed in position by simply sliding the gear wheel O over the extension of the shaft A, its hub provided with a clutch part automatically engaging the clutch part on the hub of the drum L. The sleeves T and J simply slide in position over their respective shafts. When the end plate E is bolted to the casing D the parts are firmly secured in position. Obviously as the openings for the bearings I and G are made large enough one of said bearings for the sleeve and attached parts may be removed without the other.

What I claim is:—

A clutch having an outer and an inner drum-like part, annular presser plates located between the peripheries of said drums and adapted to form a frictional engagement between the same, a presser disk forming substantially the end of said outer drum, its periphery engaging against said presser plates, and a tension spring located within the inner drum, one end engaging said presser plate and the other end engaging a portion of the inner drum, and means for preventing relative angular movement between said inner drum and said presser plate.

In testimony whereof, I sign this specification in the presence of two witnesses.

BOUDEWIJN B. NEUTEBOOM.

Witnesses:
VIRGINIA C. SPRATT,
ELLIOTT J. STODDARD.

Copies of this patent may be obtained for five cents each, by addressing the "Commissioner of Patents, Washington, D. C."